United States Patent [19]
Edwards

[11] 3,767,132

[45] Oct. 23, 1973

[54] DEVICE FOR WINDING A FILMSTRIP

[75] Inventor: Evan A. Edwards, Pittsford, N.Y.

[73] Assignee: Eastman Kodak Company, Rochester, N.Y.

[22] Filed: Apr. 6, 1970

[21] Appl. No.: 25,958

[52] U.S. Cl.............. 242/71.2, 242/68.3, 242/76, 242/197, 352/78
[51] Int. Cl. ........................................ G03b 23/02
[58] Field of Search................ 242/71.2, 71.1, 199, 242/198, 197, 200, 68.3; 95/31 AC; 352/72, 78

[56] References Cited
UNITED STATES PATENTS

| | | | |
|---|---|---|---|
| 3,642,229 | 2/1972 | Downey et al. | 242/199 |
| 2,183,522 | 12/1939 | Wittel et al. | 242/197 |
| 3,104,842 | 9/1963 | Loewe | 242/68.3 |
| 3,589,636 | 6/1971 | Brown | 242/68.3 |
| 1,942,869 | 1/1934 | McMaster | 242/71.2 |
| 3,286,945 | 11/1966 | Steisslinger | 242/71.2 |
| 3,398,912 | 8/1968 | Weggeland | 242/71.2 |

*Primary Examiner*—George F. Mautz
*Attorney*—Robert W. Hampton and D. Peter Hochberg

[57] ABSTRACT

A cartridge for winding a filmstrip includes a flangeless core rotatably supported at one portion only between a pair of stationary, parallel end walls. The longitudinal axis of the core assumes a tilted position relation to a normal to the walls upon rotation of the core to wind filmstrip thereon. The lateral edges of the outer convolutions of wound filmstrip engage diagonally opposed portions of the end walls to maintain the convolutions in accurate alignment between the walls. In one embodiment, the filmstrip is guided onto the unsupported portion of the core to engage only one end wall.

9 Claims, 7 Drawing Figures

PATENTED OCT 23 1973

EVAN A. EDWARDS
INVENTOR.

BY D. Peter Hochberg
Robert W. Hampton

ATTORNEYS

EVAN A. EDWARDS
INVENTOR.

BY D. Peter Hochberg

Robert W Hampton

ATTORNEYS 3,767,132

DEVICE FOR WINDING A FILMSTRIP

BACKGROUND OF THE INVENTION

1. Field of the Invention

The present invention relates to devices for winding webs thereon, and more specifically to film cartridges having flangeless cores for winding successive convolutions of filmstrip in accurate alignment.

2. Description of the Prior Art

Devices for winding webs about cores, such as are used for winding filmstrip on a take-up core of a camera, generally require the use of flanges on opposite ends of the core to maintain the convolutions of wound material in an orderly arrangement. Without the use of flanges, cores rotatably mounted at two ends between stationary end walls do not satisfactorily wind webs thereon, because the entire space between the walls tends to become filled with a disarray of convolutions, with resulting drag on the core and possible binding. Furthermore, known winding devices having rotatable cores for receiving webs generally require the ends of the core to be accurately located so that the convolutions will be evenly wound on the core. Thus, in those winding devices as are frequently used in take-up chambers of cameras, a core with flanges is driven at one end and the other end is closely journalled.

The disadvantages of such known devices can readily be appreciated. There is expense incurred in providing flanges for cores, in accurately locating both ends of the core, and in assembling cores so that both ends are maintained at fixed positions. Moreover, the use of flanges necessitates extra space in the housing surrounding the device.

SUMMARY OF THE INVENTION

An object of the present invention is to provide an improved winding device having a flangeless core for winding a web.

It is another object of the present invention to provide a film cartridge having a take-up compartment incorporating a flangeless core rotatable to wind film thereon in an orderly manner.

It is a more specific object of the present invention to provide a film take-up compartment having a flangeless core supported for rotation at only one portion for compactly winding substantially aligned convolutions of filmstrip thereon.

According to a preferred embodiment of the present invention, a flangeless core is mounted for rotation between a pair of stationary, parallel end walls. The core has a driven end to which torque is applied for rotating the core about its longitudinal axis, and an unengaged floating end. When the core is rotated to wind a web thereon, a resultant force is established on the core, and a moment results which causes the core to tilt within the plane of the web. As the web is wound around the core, the core tilts from an initially high degree to a continuously reduced extent, because the edges of the outermost convolutions of the web engage increasingly separated, diagonally opposed portions of the stationary walls. Edgewise alignment of the convolutions is thereby achieved. The floating end of the core can be restrained to present excessive wandering thereof, but normally this would not be necessary.

According to another preferred embodiment, the core is longer than the width of the web, and the web is guided along the stationary wall nearest the floating end of the core, and wound on that end. In this embodiment, only one wall is required for the performance of the alignment function.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which.

DETAILED DESCRIPTION OF THE INVENTION

I have found that a web can be wound on a flangeless rotating core in an accurate and orderly manner under certain conditions. First, the core must rotate about an axis which, rather than being perpendicular to the lateral edges of the web as in the usual case, can be tilted relative to said edges. Secondly, the rotating core must cooperate with at least one stationary wall which guides the web onto the core. In one embodiment of the present invention, a core rotates between a pair of parallel, stationary walls; in another embodiment, only one wall is required.

Figure 1:
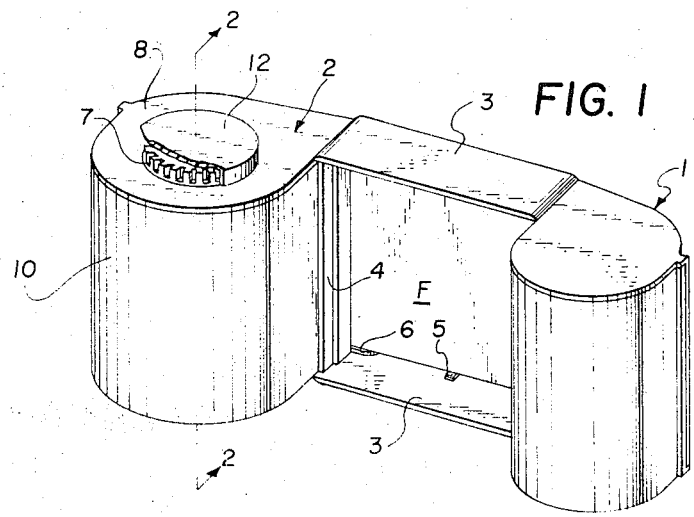
FIG. 1 is a pictorial view of a film cartridge incorporating the present invention, with a section cut away to expose the interior thereof.

Referring to FIG. 1, a film cartridge comprises supply and take-up compartments 1 and 2 respectively, separated by parallel walls 3 between the interior surfaces of which a filmstrip F is adapted to be transported from supply compartment 1 to take-up compartment 2. The cartridge is receivable in a camera and positioned therein by means of abutment surfaces 4, 5, and 6, and corresponding surfaces in the camera, to locate the portion of filmstrip F lying between compartments 1 and 2 in the focal plane of the camera optical system for exposure. A gear 7 is provided on a core in the cartridge to be driven by the camera film advance mechanism to transport filmstrip F into the take-up compartment 2, in a manner to be described below.

Figure 2:
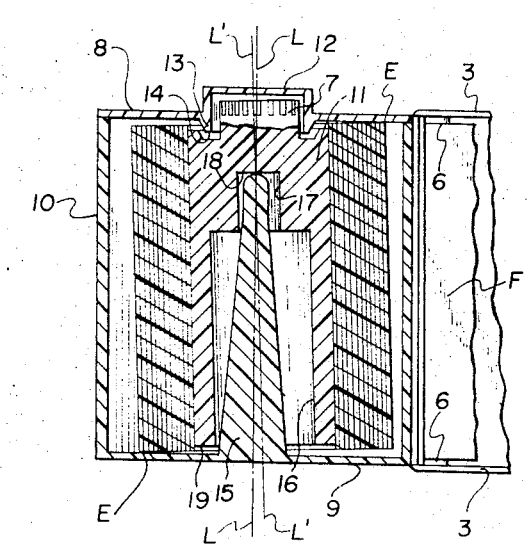
FIG. 2 is a sectional view of the take-up compartment of the film cartridge shown in FIG. 1, taken through the line 2—2.

Take-up compartment 2, as indicated by the sectional view in FIG. 2, comprises substantially cylindrical sidewalls 10 having a longitudinal axis L—L, and parallel end walls 8 and 9. A generally cylindrical core 11 is shown between end walls 8, 9, with its longitudinal axis L'—L' offset from axis L-L with several convolutions of filmstrip F wound thereon. The upper portion of core 11 includes gear 7 described previously. End wall 8 includes an elevated section 12 for containing gear 7, and an entrance is provided to give a camera drive gear access to gear 7. A labyrinth light seal is defined by an annular lip 13 extending inwardly from end wall 8, and an annular groove 14 in the upper portion of core 11 about the base of gear 7. Lip 13 and groove 14 also serve to journal core 11 for rotation in take-up compartment 2. Extending upwardly from end wall 9 along axis L—L is generally a conical spindle or post 15, which is received in the hollow portion of core 11 defined by surfaces 16, 17 and 18. Post 15 is slightly longer than the distance from the base 19 of core 11 to surface 18, so that the lower end of core 11 floats in the take-up compartment 2. Post 15 serves the dual purposes of supporting core 11 in take-up compartment 2, and of limiting the degree by which core 11 tilts relative to axis L—L. Filmstrip F is preferably somewhat wider than the length of the filmstrip engaging surface of core 11.

Filmstrip F must be secured to core 11 at the outset of the winding operation, such as by a paster tab or by some equivalent means. Prior to commencement of the winding operation, there is no transverse force exerted by filmstrip F to core 11, and axis L'—L' of core 11 coincides with axis L—L of take-up compartment 2. Upon rotation of gear 7 by the camera film advance mechanism, a transverse force is exerted on core 11 as a result of the drag on filmstrip F, and the moment resulting about the upper portion of post 15 and surface 18 causes core 11 to tilt so as to offset axis L'—L' from axis L—L. As core 11 is rotated, filmstrip F is wound around core 11, and the edges of the outermost convolutions engage diagonally opposed sections of end walls 8 and 9 as indicated by the letter designation E. As the convolutions build up on core 11, diagonally opposed wall engaging edges E of filmstrip 11 move continuously further away from core 11. As a result of the increasing separation of edges E, core 11 urged back towards its vertical alignment in take-up compartment 2, and the angle of displacement between the axes L'—L' and L—L decreases. Moreover, the successive convolutions of filmstrip F are in alignment with each other, and the upper and lower edges define planes substantially perpendicular with axis L'—L' of core 11.

Figure 3:
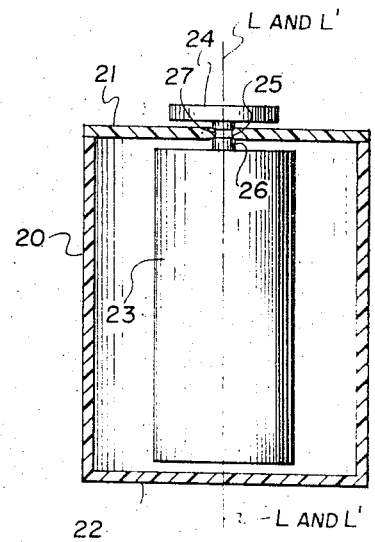
FIG. 3 is a fragmentary sectional view of the takeup compartment of a film cartridge according to the invention wherein the core is axially driven.

FIG. 3 shows another version of a take-up compartment and core according to the invention. The take-up compartment comprises generally cylindrical walls 20 and opposed parallel end walls 21 and 22. A core 23 is provided with an engageable drive element 24, such as a gear, and is journalled in end wall 2 by means of annular groove 25 in shank 26. Groove 25 has a generally semicircular profile, and engages with mating annular lip 27 in end wall 21. By means of this journal, core 23 is free to rotate about its longitudinal axis L'—L' (shown coincident with the longitudinal axis L—L of the take-up compartment, there being no filmstrip on core 23), and to tilt relative to compartment axis L—L. Moreover, there is a substantial area of engagement between groove 26 and lip 27, whereby light is effectively prevented from entering the compartment. In this embodiment, the degree of tilt is not limited by structural elements in the take-up compartment.

Figure 4:
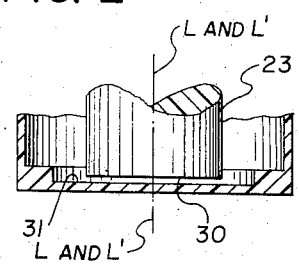
FIG. 4 shows a detail of an embodiment of the invention wherein the displacement of the floating end of the core is limited.

FIG. 4 is a slightly modified version of the embodiment shown in FIG. 3. The driving arrangement is similar to that shown in FIG. 3, but floating end 30 of core 23, rather than being unrestrained within the space between the end walls, is loosely confined in a journal 31. Journal 31 allows floating end 30 of core 23 some freedom of movement, but extreme shifting of longitudinal axis L'—L' of core 23 is prevented. A similar function was previously assigned to post 15 in FIG. 2.

Figure 5:
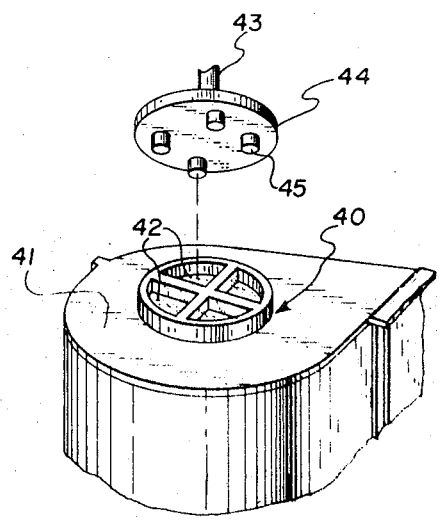
FIGS. 5 and 6 are details of driven ends of cores in accordance with further embodiments of the invention.

FIG. 5 shows another type of driving arrangement contemplated for use with the various embodiments of the invention. A disk 40 extends through an end wall 41 of a film cartridge take-up compartment and is secured to the end of a take-up core similar to those previously described, disk 40 having a number of indentations 42 which cooperate with mating elements on the driving element of a camera film advance mechanism. The driving mechanism comprises a shaft 43 secured to a disk 44 having lugs 45 extending therefrom for engagement with indentations 42 on disk 40. It can be seen that upon engagement of lugs 45 with the disk 40 and the rotation of shaft 43 by the camera operator, rotation is imparted to the core to wind filmstrip thereon.

Figure 6:
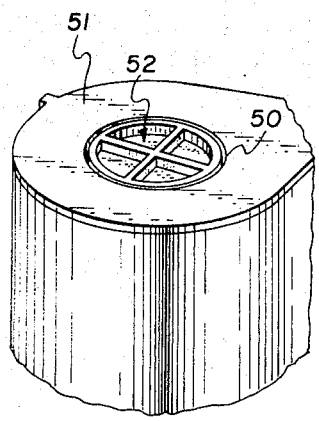

FIG. 6 shows a similar means for driving a take-up core of the type described previously. An aperture is provided in the center of end wall 51, and positioned therein is a disk 52, similar in structure to disk 40 shown in FIG. 5, and resting flush against the exterior surface of end wall 51. Disk 52 can be maintained in position by means of an arrangement of the type shown in FIG. 2, whereby disk 52 is mounted on the core, and the core rests on a post extending from the lower end wall of the winding device. Rotation of disk 52 and of the core attached thereto is accomplished in the same manner described with reference to the apparatus depicted in FIG. 5. The advantage of this embodiment is the resulting compactness of the film cartridge structure, and the absence of any members extending from the surface of the cartridge which could be damaged or broken during handling.

Figure 7:
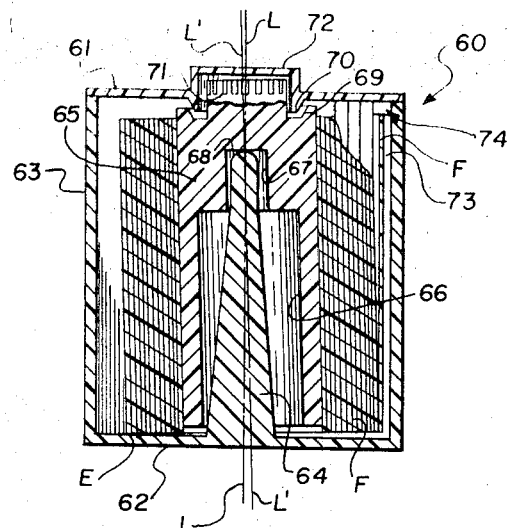
FIG. 7 is a section of another embodiment of the invention.

Referring to FIG. 7, a film take-up compartment 60 is similar in structure to that illustrated in FIGS. 1 and 2, and includes end walls 61 and 62 capping opposite ends of generally cylindrical side wall 63. Generally conical post 64 extends upwardly from end wall 62 along the longitudinal axis L—L of compartment 60, and serves to support and limit the degree of tilt of core 65 resting thereon. Core 65 is similar to core 11 already described, and includes interior surfaces 66, 67, and 68 defining a hollow section into which post 64 extends, and annular groove 69 for engaging annular lip 70 extending inwardly from end wall 61. Unlike core 11, however, core 65 is somewhat longer than the width of filmstrip F wound thereon. Gear 71 is provided on the upper portion of core 65, and is displaceable by the camera film advance mechanism for rotating the core. A section 72 of end wall 61 is contoured accommodate accommoate gear 71. A filmstrip entrance slit 73 is provided in side wall 63, and guide finger 74 extending from end wall 61 is provided for directing incoming filmstrip F to the lower portion of core 65 for the purpose to be explained below.

When filmstrip F, which must initially be attached to core 65, is directed to the lower portion of core 65 as the core rotates to draw the filmstrip into take-up compartment 60, the longitudinal axis L'—L' of core 65 tilts from axis L—L as previously discussed. However, only one edge of each outer convolution of filmstrip F engages an end wall, as distinguished from the earlier embodiment wherein diagonally opposed edges of filmstrip engaged the end walls. Specifically, as the filmstrip is wound around rotating core 65, the edge E of filmstrip F opposite entrance slit 73 and furthest from the pivot point on surface 68 about which core 65 tilts, engages the interior surface of end wall 62. It has been found that even where only the edge of one side of the filmstrip is used to engage an end wall, the convolutions of filmstrip build up and remain in a satisfactory and well aligned fashion. Substantial disarray of filmstrip F on the side of core 65 nearest entrance slit 65 could be prevented by the interior surfaces of end walls 61 and 62, although it has been found that wall engaging edge E successfully avoids substantial axial displacement of the convolutions. As the convolutions of filmstrip F increase in number, the wall engaging edge moves away from core 65, and the core is gradually urged towards the untilted position wherein the axes L—L and L'—L' coincide.

The present invention, with its various embodiments, is applicable for winding various types of photographic films, including those with backing paper. The invention is suitable for employment in size 126 film cartridges. A cartridge incorporating the invention could conveniently consist of only three molded plastic components — two for the housing and one for the core.

The invention has been described in detail with particular reference to preferred embodiments thereof, but it will be understood that variations and modifications can be effected within the spirit and scope of the invention.

I claim:

1. A device for winding a filmstrip having parallel lateral edges, said device comprising:
   means for receiving said filmstrip, said means including a pair of substantially planar walls generally opposing respective lateral edges of the filmstrip, said walls being separated by a distance greater than the width of the filmstrip;
   a flangeless core disposed between said walls for winding said filmstrip into a roll thereof, said roll having at any given time an outermost convolution, and said core having a rotary axis which intersects said walls;
   means for rotating said core about said axis; and
   means for so rotatably mounting said core, that in response to the initial winding of filmstrip about said core, said core tilts with respect to a normal to said walls causing an edge portion of the outermost convolution of said roll to contact one of said walls, whereby said core is progressively urged by said contact toward an untilted position in response to continued winding of said filmstrip.

2. In a film cartridge of the type having supply and takeup chambers and means for defining a film plane across which filmstrip may be advanced from the supply chamber to the takeup chamber, the takeup chamber being defined by generally parallel end walls and a generally cylindrical casing connecting the end walls, the end walls being laterally disposed to advancing filmstrip, and perpendicular to the film plane; the improvement comprising;
   a flangeless core disposed within the takeup chamber for winding a roll of filmstrip thereon, said roll having at any given time an outermost convolution;
   means for mounting said core for winding rotation about a first axis intersecting both of the end walls and for tilting movement of said core about a pivot point so that said core has a second axis of rotation, said second axis being skewed with respect to said first axis, said end walls being so disposed with respect to said core that during winding rotation of said core about said skewed axis a portion of the outermost convolution of said filmstrip roll contacts one of said end walls, whereby said core is urged toward an unskewed orientation in response to continued winding rotation.

3. A film cartridge as defined in claim 2 wherein said mounting means includes a core support post extending from said one of said takeup chamber end walls and defining a distal end adjacent the other of said end walls and means carried by said core for receiving said support post and for engaging said support post at a location closer to said other end wall then to said one end wall.

4. A film cartridge as defined in claim 3 wherein said support post engages said core to support said core for rotation with respect to said post and to define said pivot point.

5. A device for advancing a filmstrip along a generally planar path into a takeup chamber, said device comprising:
   a wall lying in a plane substantially perpendicular to and adjacent said path;
   a rotatable flangeless core for winding said filmstrip into a roll thereof to advance said filmstrip along said path, said roll having at any given time an outermost convolution, said core defining an axis of rotation which intersects said wall and having a floating end adjacent said wall and a driven end spaced from said wall; and
   means for mounting said core for rotation about said rotational axis and for pivotal movement about a transverse axis which intersects and is perpendicular to said rotational axis so that the said core may assume a position wherein said rotational axis is tilted with respect to said plane, said wall being so disposed with respect to said core that when said rotational axis is in said tilted position, an edge portion of the outermost convolution of filmstrip wound upon said core contacts said wall, whereby said core is urged toward an untilted position in response to continued winding.

6. A mechanism as defined in claim 5 further comprising means for guiding filmstrip along said wall.

7. A take-up compartment for a filmstrip cartridge, said compartment comprising:
   opposing first and second end walls;
   a casing extending between and connecting said end walls;
   a spindle connected to said first end wall and extending towards said second end wall, said spindle terminating at an end closer to said second end wall than to said first end wall;
   a rotatable flangeless core for winding filmstrip thereon having first and second opposed ends, and a recess in said first end defining seating means closer to said second end than said first end, said recess being of sufficient size to receive said spindle so that said spindle end engages said seating means and to permit said core to tilt around said seating means in response to drag on a filmstrip being wound on said core.

8. A take-up compartment for a filmstrip cartridge, said compartment comprising:
   opposing first and second end walls;
   a casing extending between and connecting said end walls;
   a spindle connected to said first end wall and extending towards said second end wall, said spindle terminating at an end closer to said second end wall than to said first end wall;

a rotatable flangeless core for winding filmstrip thereon having first and second opposed ends, and a recess in said first end defining seating means closer to said second end than said first end, said recess being of sufficient size to receive said spindle so that said spindle end engages said seating means and to permit said core to tilt around said seating means in response to drag on a filmstrip being wound on said core;

wherein said end walls are separated by a distance sufficiently greater than the lateral width of filmstrip being wound on said core so that as filmstrip is wound on said core, diagonally opposed lateral edges of the outermost convolution of filmstrip engage said end walls to urge said core to an untilted position.

9. Apparatus for use in forming rolls of web material, said apparatus comprising:

a wall having a substantially flat face;

a flangeless rotatable core for winding web material into a roll thereof, said roll having at any given time an outermost convolution, said core having a longitudinal axis and being so disposed that an end face of said roll is proximate and opposes said flat face of said wall;

means for rotating said core about its longitudinal axis; and mounting means for supporting said core for rotation about its longitudinal axis and for tilting movement of said core so that said longitudinal axis may assume a skewed position with respect to a normal to said wall, said core being so mounted with respect to said wall that during winding rotation of said core said core axis assumes said skewed position, whereby a portion of the outermost convolution of web material wound on said core contacts said wall and urges said core toward an unskewed position in response to continued winding.

* * * * *